United States Patent [19]

Nagura et al.

[11] Patent Number: 4,839,406

[45] Date of Patent: Jun. 13, 1989

[54] FLUIDITY CONTROLLING AGENT FOR PAINTS

[75] Inventors: Osamu Nagura, Chigasaki; Osamu Inoue, Yokohama; Yoshimasa Kamikuri, Yokohama; Norikazu Takizuka, Yokohama, all of Japan

[73] Assignee: Nippon Oil and Fats Co., Ltd., Japan

[21] Appl. No.: 95,676

[22] Filed: Sep. 14, 1987

[30] Foreign Application Priority Data

Sep. 25, 1986 [JP] Japan .............................. 61-224944
Aug. 12, 1987 [JP] Japan .............................. 62-200063

[51] Int. Cl.$^4$ .............................................. C08K 5/21
[52] U.S. Cl. ..................................... 524/196; 524/197; 524/212; 524/558; 524/604; 564/48; 564/55
[58] Field of Search .................... 564/48, 55; 524/212, 524/197, 196

[56] References Cited

U.S. PATENT DOCUMENTS

| 3,547,848 | 12/1970 | Marsh | 524/212 |
|---|---|---|---|
| 3,663,506 | 5/1972 | Knopf | 524/212 |
| 3,819,561 | 6/1974 | Bruenner | 524/212 |
| 4,083,814 | 4/1978 | Mark | 524/212 |
| 4,311,622 | 1/1982 | Buter | 260/18 CP |
| 4,383,068 | 5/1983 | Brandt | 524/212 |
| 4,482,664 | 11/1984 | Blum | 524/212 |

*Primary Examiner*—C. Warren Ivy
*Attorney, Agent, or Firm*—Arnold, White & Durkee

[57] ABSTRACT

A fluidity controlling agent for paints is provided which comprises a product obtained by reacting paratoluidine and hexamethylene diisocyanate at a particular equivalent ratio ($NH_2NCO$) and gives thixotropic properties to the paint without sagging at a large coating film thickness.

5 Claims, No Drawings

FLUIDITY CONTROLLING AGENT FOR PAINTS

BACKGROUND OF THE INVENTION

1. Field of the Invention

This invention relates to a fluidity controlling agent for paints which gives thixotoropic properties to a coating film when it is applied to the paint and hardly produces sagging even in the formation of thick coating film, and more particularly to a fluidity controlling agent useful for heat curing paints.

2. Related Art Statement

Heretofore, calcium carbonate, organic bentonite, hydrophobic silcia, organic polyamide wax, polyethylene wax and the like have been used as fluidity controlling agents for paints. Recently, compounds having a urea bond have been included in the above known fluidity controlling agents. For example, Japanese Patent laid open No. 49-99,131 discloses a fluidity controlling agent consisting of a urea adduct obtained by reacting (a) a diisocyanate compound, (b) primary and/or secondary polyamine and, if necessary, (c) monofunctional alcohol, oxime, amine and/or alkanol amine at such a ratio that the amount of primary and/or secondary amino group does not stoichiometrically exceed the amount of isocyanate group.

Furthermore, U.S. Pat. No. 4,311,622 discloses a fluidity controlling agent consisting of a reaction product of a diisocyanate and a monoamine or hydroxymonoamine of an aliphatic hydrocarbon having a carbon number of 1-5.

The fluidity controlling agent having such a urea bond has an advantage in that the effect of preventing sagging is large even in paints containing a large amount of a high polarity solvent such as alcohol, ketone or the like because the intermolecular force of the urea bond is generally strong, and the effect of preventing sagging is hardly lost even when the temperature is increased during curing when it is applied to heat curing paint. However, when such a fluidity controlling agent as disclosed in Japanese Patent laid open No. 49-99,131 is applied to a transparent clear paint containing no pigment, the sagging prevention effect is lowered with passage of time, and the gloss of the coating film is undesirably degraded if the curing is performed at a temperature below 140° C. even after the production of the paint.

On the other hand, the fluidity controlling agent made from monoamine or hydroxymonoamine of aliphatic hydrocarbon having a carbon number of 1-5 and diisocyanate, for example, benzylamine and hexametylene diisocyanate as disclosed in U.S. Pat. No. 4,311,622 is high at the melting point of the coating film and has a drawback in that when it is applied to a transparent clear paint containing no pigment, if the curing temperature is lower than 140° C. (a typical baking temperature), the gloss of the coating film is degraded.

Under the above circumstances, the inventors have made studies with respect to a means for solving the above problems and found that very high thixotropic properties are obtained by using as a fluidity controlling agent product a reaction between a primary monoamine having an amino group directly bonded to an aromatic ring and aliphatic diisocyanate. The present inventors consequently proposed a fluidity controlling agent containing a component obtained by reacting aniline and aliphatic diisocyanate and a component obtained by reacting oxygen-containing primary monoamine and aliphatic diisocyanate at a particular mixing ratio (Japanese Patent laid open No. 61-97,375). In this case, however, the oxygen-containing primary monoamine is used, so that when the molecular weight of a resin used as an organic binder is small, the water resistance of the coating film undesirably lowers.

SUMMARY OF THE INVENTION

The invention is based on the unexpected discovery that when a novel product obtained by reacting paratoluidine with hexamethylene diisocyanate at a particular ratio is used as a fluidity controlling agent for paints, in an amount smaller than the amount of the fluidity controlling agent used in U.S. Pat. No. 4,311,622 a high sagging prevention effect is obtained and also the gloss is good after curing at a relatively low temperature below 140° C. even without using the product of reaction between oxygen-containing primary monoamine and aliphatic diisocyanate as disclosed in Japanese Patent laid open No. 61-97,375.

According to the invention, there is provided a fluidity controlling agent for paints, comprising a product obtained by reacting paratoluidine and hexamethylene diisocyanate at an equivalent ratio of $NH_2/NCO$ of 0.8–1.2.

DESCRIPTION OF THE PREFERRED EMBODIMENTS

In the fluidity controlling agent according to the invention, paratoluidine wherein an amino group and a methyl group are bonded to an aromatic ring at symmetrical positions is used as a primary monoamine.

When using orthotoluidine and metatoluidine, wherein the bonding positions of amino group and methyl group are not symmetrical, and other primary monoamines wherein an amino group and aliphatic hydrocarbon residue are bonded to an aromatic ring such as 2,3-xylidine, 3,4-xylidine and the like, the high sagging prevention effect is not obtained.

On the other hand, hexamethylene diisocyanate is used as an organic polyisocyanate in the fluidity controlling agent according to the invention. The use of other diisocyanates such as tolylene diisocyanate or the like does not provide the high sagging prevention effect and lowers the gloss of the coating film.

According to the invention, it is necessary that the ratio of paratoluidine to hexamethylene diisocyanate is such that the equivalent ratio of $NH_2/NCO$ is within the range of 0.8–1.2. When the equivalent ratio of $NH_2/NCO$ is less than 0.8, excessive isocyanate groups react with each other to produce high molecular weight substance, resulting in the lowering of film gloss, or excessive isocyanate groups may react with a solvent or an active hydrogen atom of a resin so as not to provide high thixotropic properties. On the contrary, when the equivalent ratio of $NH_2/NCO$ exceeds 1.2, the color of the coating film changes to yellow or the curing is poor.

In the production of the fluidity controlling agent according to the invention, a solution of paratoluidine in an organic solvent is stirred at a temperature of not higher than 60° C., preferably 0°–40° C. in an inert gas atmosphere, to which is slowly added hexamethylene diisocyanate. As the organic solvent for dissolving paratoluidine, the use of an aromatic solvent such as benzene, toluene, xylene or the like is preferable. If necessary, there may be included an ester series solvent such as ethyl acetate, butyl acetate, amyl acetate or the like, a ketone series solvent such as acetone, metyl ethyl ketone, methyl isobutyl ketone, cyclohexanone or the like, an alcohol such as methanol, ethanol, isopropanol, n-butanol or the like, and so on. Moreover, the production of the fluidity controlling agent according to the invention may be carried out in a resin used as an organic binder component for the paint. As the resin, mention may be made of polyester resins, acyrlic resins, vinyl resins, polyurethane resins, polyether resins, petroleum resins and so on. For example, the use of the polyester resin or acrylic resin is preferable when using for applications requiring that the top coat exhibit weather resistance. When the fluidity controlling agent for paint is produced in the resin, it is preferable that the solution of paratoluidine in the organic solvent is mixed with the resin and the resulting mixture is held at a temperature of 0°-40° C., during which hexamethylene diisocyanate is slowly added while stirring at high speed.

The concentration of the fluidity controlling agent can be properly selected based on the kind of solvent used or the kind and viscosity of the resin, but it is preferably within a range of 1-10% by weight when produced in the solvent or 0.1-3% by weight when produced in the resin.

When a paint is produced using the fluidity controlling agent produced according to the method of this invention, a curing agent (for example, polyisocyanate compounds such as hexamethylene diisocyanate, isophorone diiscocyanate and the like; blocked isocyanate compounds hindering a whole or a part of isocyanate groups contained in the polyisocyanate compound with a blocking agent such as lower alcohol, ε-caprolactam, methyl ethyl ketoxime or the like; amino resins such as melamine resin, urea resin and the like; epoxy resins and so on); a pigment such as organic pigment, inorganic pigment, extender pigment and the like; an additive such as surface adjuster, anti-settling agent, heat and light deterioration preventing agents, pigment dispersing agent and the like, and further a reaction catalyst for promoting reaction may be provided in addition to the resin used as the aforementioned organic binder component.

The amount of the fluidity controlling agent according to this invention to be provided in the paint is within a range of 0.05-2% by weight per total weight of the paint, which provides high thixotropic properties and makes it possible to form thick coating films. In order to add the fluidity controlling agent according to this invention into the paint, when the fluidity controlling agent is produced in the organic solvent and is mixed with an organic solvent, it is mixed with the resin used as the organic binder in a mixing and kneading apparatus such as a dissolver, a ball mill, a sand grind mill or the like and then the resulting mixture is added into the paint. On the other hand, when the fluidity controlling agent is produced in the resin used as the organic binder component, it may be added into the paint as it is.

The fluidity controlling agent for paint according to the invention is a product obtained by using paratoluidine, wherein an amino group and a methyl group are bonded to an aromatic ring at symmetrical positions, as an organic monoamine and hexamethylene diisocyanate as an organic diisocyanate and reacting them at a particular equivalent ratio of $NH_2/NCO$ of 0.8-1.2, so that the steric configuration of the molecule is symmetrical and the crystallinity is good. Therefore, it has excellent effects in that the high sagging prevention effect is obtained at a smaller amount as compared with the same type of the conventional fluidity controlling agent, and the hardness, water resistance and solvent resistance are excellent, and the gloss is not degraded and discoloration is not caused by the curing at a lower temperature even when being applied to a transparent clear paint.

The following examples are given in illustration of the invention and are not intended as limitations thereof. Unless otherwise specified, part and percentage are by weight.

PRODUCTION EXAMPLE 1

Production of acrylic resin varnish

Into a reactor provided with an agitator, a thermometer, a reflux condenser and a monomer dropping device was charged 35.0 parts of xylene, which was refluxed by heating at a temperature of 135°-140° C. with stirring. Then, a mixture of the following monomers was placed in the monomer dropping device and added dropwise at an equal speed over 3 hours.

styrene: 12.5 parts
methyl methacrylate: 12.5 parts
butyl methacrylate: 10.0 parts
2-ethylhexyl acrylate: 13.5 parts
2-hydroxyethyl methacrylate: 10.0 parts
methacrylic acid: 2.5 parts
Perbutyl Z (trade name of polymerization initiator, made by Nippon Oils & Fats Co., Ltd.): 4.0 parts After the completion of the addition of the monomer mixture, the stirring was further continued under reflux state for 2 hours, whereby an acrylic resin varnish was obtained which had a solid content of 65% and a viscosity of Y-Z as measured at a temperature of 25° C. by means of a foam viscometer (according to JIS K5400 4.2.2).

PRODUCTION EXAMPLE 2

Production of 20% paratoluidine solution

Paratoluidine was dissolved by warming at a temperature of 40°-50° C., which was made into a 20% solution according to the following recipe:

xylene: 80.0 parts
paratoluidine: 20.0 parts

EXAMPLE 1 acrylic resin varnish of Production Example 1: 92.5 parts
20% paratoluidine solution of Production Example 2: 5.7 parts The mixture of the above components was charged into a reactor provided with an agitator, a thermometer and a dropping funnel and then cooled to a temperature of 10° C. with stirring. Thereafter, 0.9 parts hexamethylene diisocyanate and 0.9 parts xylene were placed into the dropping funnel, which were added dropwise at an equal speed over 30 minutes. After the completion of the addition, the stirring was further continued at a temperature of 10°-15° C. for 30 minutes, whereby an opaque acrylic resin varnish containing 2% per total weight of a fluidity controlling agent with an equivalent ratio of $NH_2/NCO$ of 1.0 (ratio of the moles of paratoluidine to 2 times the moles of hexamethylene diisocyanate) and having thixotropic properties was obtained. The acrylic resin varnish containing the fluidity controlling agent was used according to the following compounding recipe to prepare a paint:

acrylic resin varnish containing fluidity controlling agent: 10.0 parts acrylic resin varnish of Production Example 1: 56.0 parts
Super Beckamin L-116-70 (trade name of butylated melamine resin, made by Dainippon Ink Chemicals Industries, Ltd.): 27.0 parts
xylene: 4.0 parts
n-butyl alcohol: 3.0 parts The resulting paint was diluted with a mixed solution of 90 parts xylene and 30 parts n-butyl alcohol of to a viscosity of 30 seconds as measured at a temperature of 20° C. through Ford Cup No. 4, which was applied by spraying to a vertical test plate (Bonderite #3004, trade name of phosphated steel sheet, made by Nippon Perkalizing Co., Ltd.) and cured at a temperature of 120° C. for 30 minutes. As a result, sagging was not caused and the gloss was good when the thickness of coating film reached up to 49 μm. A

EXAMPLE 2

An acrylic resin varnish containing 2% of a fluidity controlling agent with an equivalent ratio of $NH_2/NCO$ of 0.8 was produced according to the following compounding recipe in the same manner as in Example 1:
acrylic resin varnish of Production Example 1: 92.5 parts
20% paratoluidine solution of Production Example 2: 5.0 parts
hexamethylene diisocyanate: 1.0 parts
xylene: 1.5 parts This acrylic resin varnish containing the fluidity controlling agent was used to prepare a paint in the same manner as in Example 1, which was then applied in the same manner as in Example 1. As a result, when the thickness of the coating film reached up to 47 μm, sagging was not caused and the gloss of the film was good.

EXAMPLE 3

An acrylic resin varnish containing 2% of a fluidity controlling agent with an equivalent ratio of $NH_2/NCO$ of 1.2 was produced according to the following compounding recipe in the same manner as in Example 1:
acrylic resin varnish of Production Example 1: 92.5 parts
20% paratoluidine solution of Production Example 2: 6.0 parts
hexamethylene diisocyanate: 0.8 part
xylene: 0.7 part This acrylic resin varnish containing the fluidity controlling agent was used to prepare a paint in the same manner as in Example 1, which was then applied in the same manner as in Example 1. As a result, when the thickness of coating film reached up to 48 μm, sagging was not caused and the gloss of the film was good.

PRODUCTION EXAMPLE 3

Production of polyester resin varnish

Into a reactor provided with an agitator, a reflux condenser attached with a distilled water separating device, a thermometer and an inert gas supply tube were charged the following components:
neopentyl glycol: 25.3 parts
trimethylol propane: 6.0 parts
adipic acid: 25.9 parts
isophthalic acid: 14.3 parts These components were heated to a temperature of 120° C., stirred and then heated to a temperature of 200° C. to further conduct the reaction, during which a small amount of the content was sometimes taken out to measure the acid value. When the acid value reached 15, the reaction product was cooled and then diluted with the following components:
xylene: 18.0 parts
Solveso 150 (trade name of high boiling aromatic solvent, made by Esso Chemicals Co., Ltd.): 10.5 parts The amount of distilled water in the reaction was 18 parts. Thus, there was obtained a polyester resin varnish having a solid content of 65% and a viscosity of X-Y as measured at a temperature of 25° C. by means of a foam viscometer (according to JIS K5400 4.2.2).

EXAMPLE 4

(1) Production of polyester resin varnish containing fluidity controlling agent (1)
polyester resin varnish of Production Example 3: 98.2 parts,
20% paratoluidine solution of Production Example 2: 1.4 parts The mixture of the above components was charged into a reactor provided with an agitator, a thermometer and a dropping funnel and then cooled to a temperature of 10° C. with stirring. Thereafter, 0.2 part of hexamethylene diisocyanate and 0.2 part of xylene were placed in the dropping funnel and added dropwise at an equal speed over 30 minutes. After the completion of the addition, the stirring was further continued at a temperature of 10°-15° C. for 30 minutes. Thus, there was obtained a slightly opaque polyester resin varnish containing 0.5% per total weight of a fluidity controlling agent with an equivalent ratio of $NH_2/NCO$ of 1.0 and having thixotropic properties.

(2) Production and application of white paint containing fluidity controlling agent
polyester resin varnish of Production Example 3: 13.4 parts
titanium dioxide (JR-602, trade name, made by Teikoku Kako Co., Ltd.): 29.0 parts
xylene: 4.4 parts
ethylene glycol monoethyl ether acetate: 4.4 parts The mixture of the above components was dispersed by means of a glass bead mill for 1 hour. After the removal of glass beads by filtration, the following components were added with stirring:
polyester resin varnish of Production Example 3: 7.2 parts
polyester resin varnish containing the fluidity controlling agent (1): 20.0 parts
Super Beckamin L-116-70: 16.0 parts
BYK-300 (trade name of silicon resin additive, made by BYK Chemie Gmbh): 0.1 part
Solveso 150: 2.5 parts
n-butyl alcohol: 3.0 parts This paint was diluted and applied by spraying in the same manner as in Example 1. As a result, when the thickness of coating film reached 60 μm, sagging was not caused and the gloss was good.

EXAMPLE 5

(1) Production of polyester resin varnish containing fluidity contolling agent (2)

A polyester resin varnish containing 3.0% of fluidity controlling agent with an equivalent ratio of $NH_2/NCO$ of 1.0 was produced according to the following compounding recipe in the same manner as in item (1) of Example 4:

polyester resin varnish of Production Example 3: 88.9 parts
20% paratoluidine solution of Production Example 2: 8.5 parts
hexamethylene diisocyanate: 1.3 parts
xylene: 1.3 parts (2) Production and application of white paint containing fluidity controlling agent
polyester resin varnish of Production Example 3: 13.4 parts
titanium dioxide: 29.0 parts
xylene: 4.4 parts
ethylene glycol monoethyl ether acetate: 4.4 parts The mixture of the above components was dispersed and filtered in the same manner as in the item (2) of Example 4, to which were added the following components:
polyester resin varnish of Production Example 3: 21.0 parts
polyester resin varnish containing the fluidity controlling agent (2): 6.5 parts
Super Beckamin L-116-70: 15.7 parts
BYK-300: 0.1 part
Solveso 150: 2.5 Parts
n-butyl alcohol: 3.0 parts This paint was diluted and applied by spraying in the same manner as in Example 1. As a result, when the thickness of the coating film reached 65 μm, sagging was not caused and the gloss was good.

EXAMPLE 6

The following components were mixed:
acrylic resin varnish of Production Example 1: 50.0 parts
acrylic resin varnish containing the fluidity controlling agent of Example 1: 25.0 parts
ethylene glycol momoethyl ether acetate: 5.0 parts
butyl acetate: 7.5 parts The resulting mixture was added with 12.5 parts of polyisocyanate (Desmodule N-75, trade name, made by Bayer AG, heating residue: 75%) as a curing agent.

The thus produced paint capable of curing with polyisocyanate was diluted with a mixed solvent of 70 parts butyl acetate and 30 parts cyclohexanone to a viscosity of 30 seconds as measured at a temperature of 20° C. through Ford Cup No. 4 and then applied by spraying in the same manner as in Example 1. As a result, when the thickness of the coating film reaching 50 μm, sagging was not caused and the gloss was good.

EXAMPLE 7

(1) Production of fluidity controlling agent in solvent
xylene: 81.6 parts
20% paratoluidine solution: 14.0 parts The mixture of the above components was charged into a reactor provided with an agitator, a thermometer and a dropping device, to which was added dropwise a mixture of 2.2 parts of hexamethylene diisocyanate and 2.2 parts of xylene from the dropping device with stirring over 2 hours. In this case, the temperature was maintained so as not to exceed 40° C. After the completion of the addition, the stirring was further continued for 1 hour. Thus, there was obtained a white waxy mixture of fluidity controlling agent and xylene containing 5% of the fluidity controlling agent with a equivalent ratio of NH$_2$/NCO of 1.0.

(2) Production of paint

The mixture containing 5% of the fluidity controlling agent was mixed with the acrylic resin varnish of Production Example 1 at the following mixing ratio and dispersed in a ball mill for 24 hours:
mixture containing 5% of fluidity controlling agent: 20.0 parts
acrylic resin varnish of Production Example 1: 20.0 parts After the dispersion, balls were removed by filtering through a wire net, and then the following components were mixed to obtain a paint containing 1% per total weight of the fluidity controlling agent:
acrylic resin varnish of Production Example 1: 33.6 parts
Super Beckamin L-116-70: 26.5 parts This paint had thixotropic properties, which was diluted and applied by spraying in the same manner as in Example 1. As a result, when the thickness of the coating film reached 61 μm, sagging was not caused and the gloss of the film was good.

EXAMPLE 8

(1) Production of fluidity controlling agent in solvent
xylene: 63.2 parts
20% paratoluidine solution: 28.0 parts The mixture of the above components was charged in the same reactor as in Example 7 and the following mixture was added dropwise thereto from the dropping device over 4 hours with stirring:
hexamethylene diisocyanate: 4.4 parts
xylene: 4.4 parts During the addition of the mixture, the temperature was maintained so as not to exceed 40° C. After completion of the addition, the stirring was further continued for 1 hour. In this way, there was obtained a white waxy mixture of fluidity controlling agent and xylene containing 10% of the fluidity controlling agent with an equivalent ratio of NH$_2$/NCO of 1.0.

(2) Production of paint

The above mixture containing 10% of the fluidity controlling agent was mixed with the acrylic resin varnish at the following compounding recipe and dispersed through a ball mill for 24 hours:
mixture containing 10% of fluidity controlling agent: 20.0 parts
acrylic resin varnish of Production Example 1: 20.0 parts After the dispersion, balls were removed by filtering through a wire net and then the following components were mixed to obtain a paint containing 2% fluidity controlling agent per total weight:
acrylic resin varnish of Production Example 1: 33.6 parts
Super Beckamin L-116-70: 26.7 parts This paint had thixotropic properties, and was diluted and applied by spraying in the same manner as in Example 1. As a result, when the thickness of the coating film reached 60 μm, sagging was not caused and the gloss of the film was good.

EXAMPLE 9 polyester resin varnish of Production Example 3: 12.4 parts
mixture containing 5% of fluidity controlling agent in Example 7: 1.0 part
titanium dioxide: 29.0 parts
ethylene glycol monoethyl ether acetate: 4.4 parts
xylene: 4.4 parts The mixture of the above components was dispersed through a ball mill for 24 hours and then balls were removed by filtering through a wire net. Thereafter, the following components were mixed with stirring:

polyester resin varnish of Production Example 3: 27.2 parts
Super Beckamin L-116-70: 16.0 parts
BYK-300: 0.1 part
Solveso 150: 2.5 parts
n-butyl alcohol: 3.0 parts This paint was diluted and applied by spraying in the same manner as in Example 1. As a result, when the thickness of the coating film reached 50 μm, sagging was not caused and the gloss was good.

COMPARATIVE EXAMPLE 1

An acrylic resin varnish containing 2% of fluidity controlling agent with an equivalent ratio of $NH_2/NCO$ of 0.6 was produced according to the following compounding recipe in the same manner as in Example 1:

acrylic resin varnish of Production Example 1: 92.5 parts
20% paratoluidine solution: 4.3 parts
hexamethylene diisocyanate: 1.1 parts
xylene: 2.1 parts This acrylic resin varnish containing the fluidity controlling agent was low in thixotropic properties. This varnish was used to prepare a paint in the same manner as in Example 1. When the thickness of coating film reached 29 μm by applying the resulting paint, sagging was caused and the gloss of the film was poor.

COMPARATIVE EXAMPLE 2

An acrylic resin varnish containing 2% of fluidity controlling agent with equivalent ratio of $NH_2/NCO$ of 1.4 was prepared according to the following compounding recipe in the same manner as in Example 1:

acrylic resin varnish of Production Example 1: 92.5 parts
20% paratoluidine solution: 6.4 parts
hexamethylene diisocyanate: 0.7 part
xylene: 0.4 part A paint was prepared by using the acrylic resin varnish containing the fluidity controlling agent in the same manner as in Example 1. When the thickness of the coating film reached 45 μm, sagging was not caused, but the color of the film was changed into yellow. Further, the water resistance, solvent resistance and hardness were poor as tested according to the film performance test mentioned below.

COMPARATIVE EXAMPLE 3

An acrylic resin varnish containing 3% of fluidity controlling agent was produced by using orthotoluidine as a primary monoamine according to the following compounding recipe:

acrylic resin varnish of Production Example 1: 92.5 parts
orthotoluidine: 1.7 parts
xylene: 3.2 parts That is, the above mixture was charged into the same reactor as in Example 1 and cooled to a temperature of 10° C. with stirring. Then, 1.3 parts of hexamethylene diisocyanate and 1.3 parts of xylene were placed in the dropping device and added dropwise at an equal speed over 30 minutes. After completion of the addition, the stirring was further continued at a temperature of 10°–15° C. for 30 minutes. The thus obtained acrylic resin varnish containing 3% of the fluidity controlling agent was used to prepare a paint having the following compounding recipe:

acrylic resin varnish containing the fluidity controlling agent: 33.3 parts
acrylic resin varnish of Production Example 1: 32.7 parts
Super Beckamin L-116-70: 27.0 parts
xylene: 4.0 parts
n-butyl alcohol: 3.0 parts When this paint was applied in the same manner as in Example 1, sagging was caused at a thickness of 22 μm.

COMPARATIVE EXAMPLE 4

An acrylic resin varnish containing 3% of fluidity controlling agent was produced by using 3,4-xylidine as a primary monoamine according to the following compounding recipe:

acrylic resin varnish of Production Example 1: 92.5 parts
3,4-xylidine: 1.8 parts
xylene: 3.3 parts That is, the above mixture was charged into the same reactor as in Example 1 and cooled to a temperature of 10° C. with stirring. Then, 1.2 parts of hexamethylene diisocyanate and 1.2 parts of xylene were placed in the dropping device and added dropwise at an equal speed over 30 minutes. After the completion of the addition, the stirring was further continued at a temperature of 10°–15° C. for 30 minutes. The thus obtained acrylic resin varnish containing 3% of the fluidity controlling agent was used to prepare a paint according to the following compounding recipe:

acrylic resin varnish containing fluidity controlling agent: 33.3 parts
acrylic resin varnish of Production Example 1: 32.7 parts
Super Beckamin L-116-70: 27.0 parts
xylene: 4.0 parts
n-butyl alcohol: 3.0 parts When the resulting paint was applied in the same manner as in Example 1, sagging was caused at a thickness of 25 μm.

COMPARATIVE EXAMPLE 5 acrylic resin varnish of Production Example 1: 94.4 parts
aniline: 1.4 parts
hexamethylene diisocyanate: 1.4 parts
xylene: 2.8 parts An acrylic resin varnish containing a fluidity controlling agent derived from aniline was produced according to the above compounding recipe in the same manner as in Example 1. Separately, an acrylic resin varnish containing a fluidity controlling agent derived from an oxygen-containing primary monoamine was produced according to the following compounding recipe in the same manner as described above:

acrylic resin varnish of Production Example 1: 94.4 parts
monoethanolamine: 1.1 parts
hexamethylene diisocyanate: 1.7 parts
xylene: 2.8 parts A paint was prepared by using these two acrylic resin varnishes according to the following compounding recipe:

acrylic resin varnish of Production Example 1: 40.2 parts acrylic resin varnish containing the fluidity controlling agent derived from aniline: 17.9 parts
acrylic resin varnish containing the fluidity controlling agent derived from monoethanolamine: 17.9 parts
Super Beckamine L-116-70: 24.0 parts When the resulting paint was applied in the same manner as in Example 1, sagging was not caused at a thickness up to 42 μm and the gloss of the film was good, but the water resistance was poor.

COMPARATIVE EXAMPLE 6

An acrylic resin varnish containing 3% of fluidity controlling agent derived from benzylamine was produced according to the following compounding recipe in the same manner as in Example 1:
acrylic resin varnish of Production Example 1: 92.5 parts
benzylamine: 1.7 parts
hexamethylene diisocyanate: 1.3 parts
xylene: 4.5 parts A paint was prepared using the acrylic resin varnish containing the fluidity controlling agent according to the following compounding recipe:
acrylic resin varnish of Production Example 1: 32.7 parts
acrylic resin varnish containing the fluidity controlling agent: 33.3 parts
Super Beckamin L-116-70: 27.0 parts
xylene: 4.0 parts
n-butyl alcohol: 3.0 parts When the resulting paint was applied in the same manner as in Example 1, sagging was caused at a thickness of 32 μm and the gloss of the film was poor.

The film performance test was made with respect to the test plates coated with each paint of Examples 1–9 and Comparative Examples 1–5 according to the following evaluation methods to obtain results as shown in the following Table 1.

Evaluation methods

Gloss: measured by means of a Dorigon meter made by Hunter Laboratories, and represented by a gloss value (Rs) reflected at 30°.

Discoloration: visual observation.

Hardness: according to a pencil scrubbing test of JIS K5400 6.14

Water resistance: discoloration and softening of the film were measured after the immersion in water at 80° C. for 3 hours.

Solvent resistance: the discoloration and softening of the film were measured after the immersion in a mixture of 90%/10% of petroleum benzine/methyl alcohol at room temperature for 1 hour.

TABLE 1

| | Example | | | | | | | | |
|---|---|---|---|---|---|---|---|---|---|
| | 1 | 2 | 3 | 4 | 5 | 6 | 7 | 8 | 9 |
| Fluidity controlling agent | | | | | | | | | |
| Production method (reaction solvent) | varnish | varnish | varnish | varnish | varnish | varnish | solvent | solvent | solvent |
| Concentration in production (%) | 2 | 2 | 2 | 0.5 | 3 | 2 | 5 | 10 | 5 |
| equivalent ratio of $NH_2/NCO$ | 1.0 | 0.8 | 1.2 | 1.0 | 1.0 | 1.0 | 1.0 | 1.0 | 1.0 |
| Compounding recipe for paint | | | | | | | | | |
| Acrylic resin varnish of Production Example 1 | 56.0 | 56.0 | 56.0 | — | — | 50.0 | 33.6 | 33.6 | — |
| Acrylic resin varnish containing fluidity controlling agent[1] | 10.0 | 10.0 | 10.0 | — | — | 25.0 | 40.0 | 40.0 | — |
| Polyester resin varnish of Production Example 3 | — | — | — | 20.6 | 34.4 | — | — | — | 39.6 |
| Polyester resin varnish containing fluidity controlling agent[2] | — | — | — | 20.0 | 6.5 | — | — | — | 1.0 |
| Super Beckamin L-116-70[3] | 27.0 | 27.0 | 27.0 | 16.0 | 15.7 | — | 26.4 | 26.4 | 16.0 |
| Desmodule-N-75[4] | — | — | — | — | — | 12.5 | — | — | — |
| JR-602[5] | — | — | — | 29.0 | 29.0 | — | — | — | 29.0 |
| BYX-300[6] | — | — | — | 0.1 | 0.1 | — | — | — | 0.1 |
| xylene | 4.0 | 4.0 | 4.0 | 4.4 | 4.4 | — | — | — | 4.4 |
| Ethylene glycol monoethyl ether acetate | — | — | — | 4.4 | 4.4 | 5.0 | — | — | 4.4 |
| Solveso 150[7] | — | — | — | 2.5 | 2.5 | — | — | — | 2.5 |
| n-butyl alcohol | 3.0 | 3.0 | 3.0 | 3.0 | 3.0 | — | — | — | 3.0 |
| butyl acetate | — | — | — | — | — | 7.5 | — | — | — |
| total | 100.0 | 100.0 | 100.0 | 100.0 | 100.0 | 100.0 | 100.0 | 100.0 | 100.0 |
| Content of fluidity controlling agent (%)[8] | 0.2 | 0.2 | 0.2 | 0.1 | 0.2 | 0.5 | 1.0 | 2.0 | 0.05 |
| Sagging limit thickness (μm)[9] | 49 | 47 | 48 | 60 | 65 | 50 | 61 | 60 | 50 |
| Film performances | | | | | | | | | |
| Gloss | 92 | 90 | 91 | 91 | 87 | 94 | 89 | 87 | 90 |
| Discoloration | none | none | none | none | none | none | none | none | none |
| Hardness | H | H | H | H | H | F | H | H | H |
| Water resistance | good | good | good | good | good | good | good | good | good |
| Solvent resistance | good | good | good | good | good | good | good | good | good |

| | Comparative Example | | | | | |
|---|---|---|---|---|---|---|
| | 1 | 2 | 3 | 4 | 5 | 6 |
| Fluidity controlling agent | varnish | varnish | varnish | varnish | varnish | varnish |
| Production method (reaction solvent) | | | | | | |
| Concentration in production (%) | 2 | 2 | 3 | 3 | 2.8 | 3 |
| equivalent ratio of $NH_2/NCO$ | 0.6 | 1.4 | 1.0 | 1.0 | 1.0 | 1.0 |
| Compounding recipe for paint | | | | | | |
| Acrylic resin varnish of | 56.0 | 56.0 | 32.7 | 32.7 | 40.2 | 32.7 |

TABLE 1-continued

| | | | | | | |
|---|---|---|---|---|---|---|
| Production Example 1 Acrylic resin varnish containing fluidity controlling agent[1] | 10.0 | 10.0 | 33.3 | 33.3 | 35.8 | 33.3 |
| Polyester resin varnish of Production Example 3 | — | — | — | — | — | — |
| Polyester resin varnish containing fluidity controlling agent[2] | — | — | — | — | — | — |
| Super Beckamin L-116-70[3] | 27.0 | 27.0 | 27.0 | 27.0 | 24.0 | 27.0 |
| Desmodule-N-75[4] | — | — | — | — | — | — |
| JR-602[5] | — | — | — | — | — | — |
| BYX-300[6] | — | — | — | — | — | — |
| xylene | 4.0 | 4.0 | 4.0 | 4.0 | — | 4.0 |
| Ethylene glycol monoethyl ether acetate | — | — | — | — | — | — |
| Solveso 150[7] | — | — | — | — | — | — |
| n-butyl alcohol | 3.0 | 3.0 | 3.0 | 3.0 | — | 3.0 |
| butyl acetate | — | — | — | — | — | — |
| total | 100.0 | 100.0 | 100.0 | 100.0 | 100.0 | 100.0 |
| Content of fluidity controlling agent (%)[8] | 0.2 | 0.2 | 1.0 | 1.0 | 1.0 | 1.0 |
| Sagging limit thickness (μm)[9] | 29 | 45 | 22 | 25 | 42 | 32 |
| Film performances | | | | | | |
| Gloss | 67 | 87 | 86 | 87 | 86 | 62 |
| Discoloration | none | change into yellow | none | none | none | none |
| Hardness | H | B | H | H | F | H |
| Water resistance | good | opaque | good | good | opaque | opaque |
| Solvent resistance | good | softening | good | good | good | softening |

Note:
(1) acrylic resin varnish containing the fluidity controlling agent produced in each of Examples 1-3, 6-8 and Comparative Examples 1-6
(2) polyester resin varnish containing the fluidity controlling agent produced from each of Examples 4, 5, 9
(3) trade name of butylmelamine resin, made by Dainippon Ink Chemical Industries Ltd., heating residue: 68%
(4) trade name of polyisocyanate, made by Bayer AG, heating residue: 75%
(5) trade name of titanium dioxide, made by Teikoku Kako Co., Ltd.
(6) trade name of silicon resin additive, made by BYK Chemie Gmbh
(7) trade name of high boiling aromatic solvent, made by Esso Chemicals Ltd.
(8) content of fluidity controlling agent in total paint weight before dilution of paint
(9) sagging limit thickness (μm) after the paint diluted to 30 seconds (20° C.) through Ford Cup No. 4 was applied by spraying to a vertical test plate (Bonderite #3004, made by Nippon Perkalizing Co., Ltd., trade name of phosphated steel sheet) and then cured at a temperature of 120° C. at a vertical position for 30 minutes As seen from the above results, the paints using the fluidity controlling agent according to the invention in Examples 1-9 can be applied at a greater thickness, and exhibit good gloss even after curing at a temperature of 120° C., and exhibit good film performance such as discoloration, hardness, water resistance, solvent resistance and the like.

On the other hand, in case of Comparative Example 1 wherein the equivalent ratio of NH$_2$/NCO is less than 0.8, the sagging prevention effect is insufficient and the gloss of the film is poor. In Comparative Example 2 wherein the equivalent ratio of NH$_2$/NCO exceeds 1.2, the color of the film is changed into yellow during the curing, and the curing is poor at a curing temperature of 120° C., and the hardness, water resistance and solvent resistance are also poor. In Comparative Examples 3 and 4 wherein orthotoluidine and 3,4-xylidine are used as a primary monoamine, even when the fluidity controlling agent is compounded in an amount of 1% per total weight of the paint, the sagging prevention effect is poor. In Comparative Example 5 according to Japanese Patent laid open No. 61-97,375, the hardness and water resistance are poor at a curing temperature of 120° C. In Comparative Example 6 according to U.S. Pat. No. 4,311,622, even when the fluidity controlling agent is compounded in an amount of 1% per total weight of the paint, the sagging prevention effect is poor, and the gloss of the film cured at a temperature of 120° C. is poor, and also the water resistance and solent resistance are poor.

What is claimed is:

1. A fluidity controlling agent for paints, comprising a reaction product obtained by reacting paratoluidene and hexamethylene diisocyanate at an equivalent ratio of NH$_2$ to NCO ranging from 0.8/1 to 1.2/1.

2. The fluidity controlling agent according to claim 1, wherein said reaction product is produced in an organic solvent.

3. The fluidity controlling agent according to claim 2, wherein a concentration of said reaction product in said organic solvent is from 1 to 10% by weight.

4. The fluidity controlling agent according to claim 1, wherein said reaction product is produced in a resin used as an organic binder component.

5. The fluidity controlling agent according to claim 4, wherein a concentration of said reaction product in said resin is from 0.1 to 3% by weight.

* * * * *